United States Patent [19]

Schlenker

[11] Patent Number: 4,623,024

[45] Date of Patent: Nov. 18, 1986

[54] FURROW-FORMING ATTACHMENT FOR A TRACTOR

[76] Inventor: Donald D. Schlenker, Burlington, Wyo. 82411

[21] Appl. No.: 719,713

[22] Filed: Apr. 2, 1985

[51] Int. Cl.<sup>4</sup> .................... A01B 29/00; A01B 35/28
[52] U.S. Cl. ................... 172/572; 172/624.5
[58] Field of Search ................ 172/624.5, 573, 415, 172/572, 537, 415, 518, 176, 671

[56] References Cited

U.S. PATENT DOCUMENTS

| 585,411 | 6/1897 | Taylor | 172/DIG. 1 CF |
|---|---|---|---|
| 815,048 | 3/1906 | Smith | 172/176 X |
| 1,054,659 | 2/1913 | Luke | 172/176 |
| 1,331,722 | 2/1920 | Remy | 172/537 |
| 1,642,908 | 9/1927 | Taylor | 172/573 |
| 1,763,166 | 6/1930 | Lindberg | 172/537 X |
| 1,782,201 | 11/1930 | Dunham | 172/537 X |
| 1,898,870 | 2/1933 | Domries | 172/1 CF |
| 2,303,043 | 11/1942 | Goodman | 172/176 |
| 4,116,140 | 9/1978 | Anderson | 172/500 |
| 4,176,721 | 12/1979 | Poggemiller | 172/572 |
| 4,493,375 | 1/1985 | Winter | 172/176 |

FOREIGN PATENT DOCUMENTS 1489215 6/1967 France .................... 111/88

Primary Examiner—Richard J. Johnson
Attorney, Agent, or Firm—Harvey B. Jacobson

[57] ABSTRACT

An attachment for forming an irrigation furrow in top soil of a crop-growing field comprises a carriage for towing behind a tractor or the like, the carriage having a forward furrow-forming roller and an aligned aft furrow-forming roller and a suspension assembly with individual spring devices for applying resilient downward pressure on the forward and aft rollers. In use, the aft roller breaks up soil clods and the like which may collect behind the forward roller in the formation of the furrow, thereby producing a smooth and regular furrow enhancing the flow of irrigation water therein.

14 Claims, 4 Drawing Figures

FURROW-FORMING ATTACHMENT FOR A TRACTOR

BACKGROUND OF THE INVENTION

This invention relates to apparatus which is towed by a tractor or the like for the purpose of forming irrigation furrows in crop-growing soil. Crop-growing fields, for example, are commonly irrigated by forming parallel irrigation furrows in the top soil, lengthwise of the field, and causing water to flow down the furrows, e.g. from an upper level of the field to a lower level.

For optimum irrigation, it is desirable that the furrows be smooth and regular, since any obstructions, such as soil clods in a furrows will tend to interfere with the smooth water flow and may lead to uneven irrigation of a field with flooding in one area and starving in another. The invention provides apparatus particularly adept for forming irrigations furrows of smooth regular form.

STATEMENT OF PRIOR ART

Applicant is aware of the following U.S. patents, the relevance of which is that they relate to agricultural implements towed by tractors and the like. None of the patents, however, discloses apparatus having the features of the present invention.

U.S. Pat. No. 297,084: Munz, et al: 4-15-1885
U.S. Pat. No. 365,209: Twick: 6-21-1887
U.S. Pat. No. 1,367,736: Dunham: 2-8-21
U.S. Pat. No. 1,763,166: Lindburg: 5-15-28
U.S. Pat. No. 1,782,201: Dunham: 11-18-30
U.S. Pat. No. 2,040,710: Riehl: 5-12-36
U.S. Pat. No. 2,574,379: Cummings: 11-6-51
U.S. Pat. No. 4,116,140: Anderson, et al: 9-26-78
U.S. Pat. No. 4,418,761: Dietrich, Sr. et al: 12-6-83

SUMMARY OF THE INVENTION

The invention provides a furrow-forming attachment to be towed by a tractor or the like comprising a carriage having longitudinally aligned forward and aft ground-engageable furrow-forming rollers, a pivotal linkage for connection between a forward end of the carriage and a tool bar or the like at the rear of a tractor, a primary suspension spring assembly for connection between the linkage and the tool bar for applying resilient downward pressure on the carriage urging at least the forward roller into ground engagement, and a secondary suspension spring assembly for connection between the linkage and a part of the carriage behind the forward roller for resiliently urging the aft roller into ground engagement independently of the forward roller.

The rollers preferably have a V-shaped profile advantageous in applying downward and outward pressure on the soil and forming an effectively shaped furrow. In use, the independent-type suspension of the forward and aft rollers is found effective in the formation of a smooth and regular furrow, with the aft roller breaking clods or the like which may collect behind the forward roller as it forms the furrow, and generally smoothing down the furrow walls. The rollers may be substantially identical in configuration, and means may be provided for adjusting the individual tension of both the primary and secondary suspension spring assemblies to suit particular soil and other conditions. A row of furrow-forming attachments in accordance with the invention may, for example, be attached side by side to a tool bar to form a row of furrows with each pass of the tractor.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
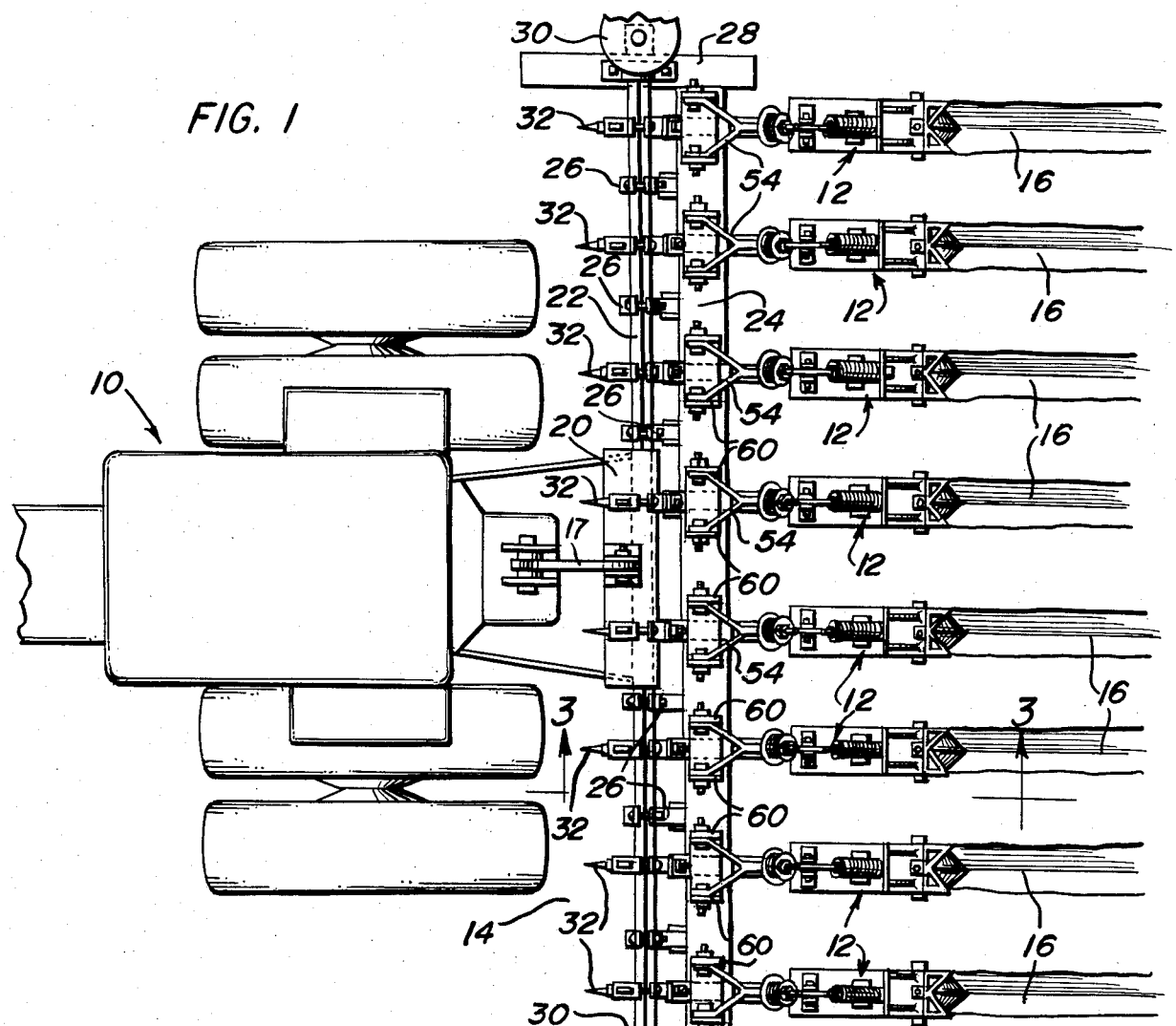
FIG. 1 is a plan view of the tractor fitted with a row of furrow-forming attachments in accordance with the invention.
Figure 2:
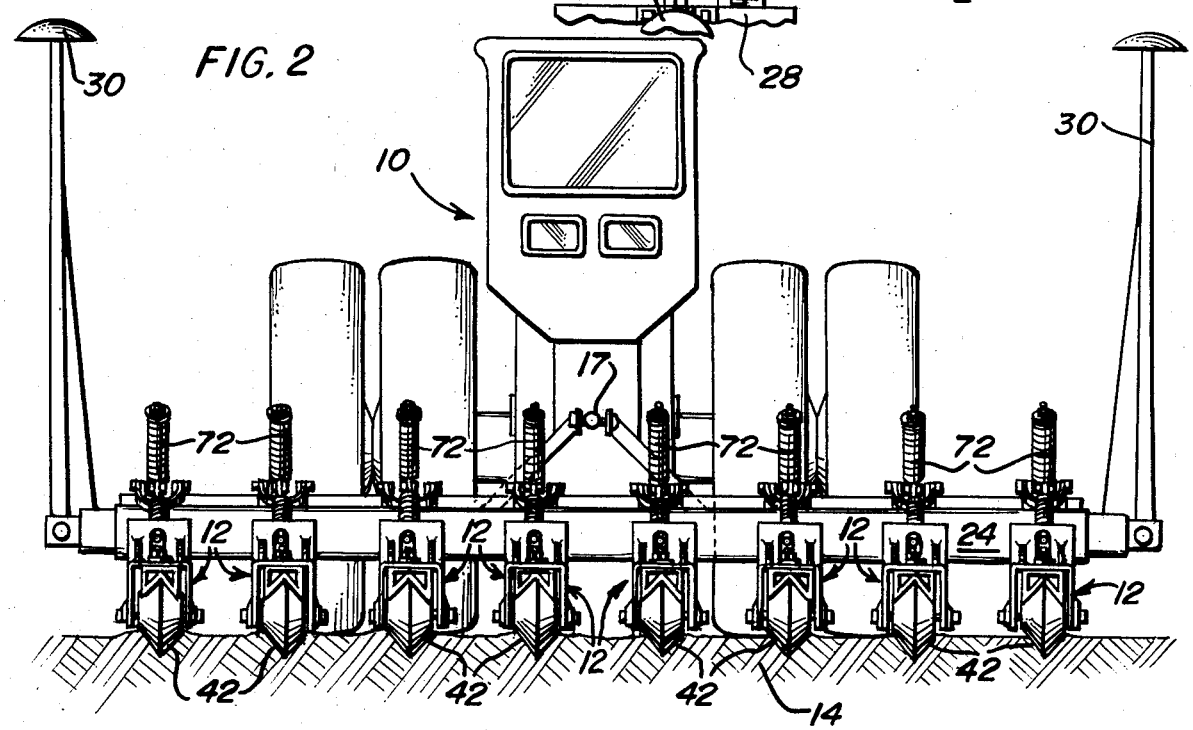
FIG. 2 is a rear elevational view of the tractor.

Referring initially to FIGS. 1 and 2, there is illustrated a tractor 10 which pulls a row of furrow-forming attachments, each indicated by reference 12, over a field 14 to form an equivalent row of irrigation furrows 16 in the top soil along the length of the field.

The invention resides predominantly in the structure of the individual furrow-forming attachments, rather than in the equipment whereby the attachments are secured behind the tractor, since various different forms of tractor hitches, tool bars, clamps and the like are readily available, and the inventive attachments may be equally well towed by any suitable combination of these. For example, in the illustrated arrangement, tractor 10 has a three-point hitch with upper and lower links 17, 18 respectively connected to a tool bar carrier 20 supporting a solid tool bar 22. A hollow tool bar 24 is attached behind the solid tool bar, for example by means of clamping links 26, and end connectors 28 carrying conventional elongate pivoting markers 30. The furrow-forming attachments 12 are connected to the hollow tool bar 24 as will be described. The solid tool bar 22 may carry a row of bull shanks 32 clamped to the bar in known manner, the bull shanks being aligned longitudinally with the respective furrow-forming attachments to loosen the soil in advance of the attachments.

Figure 3:
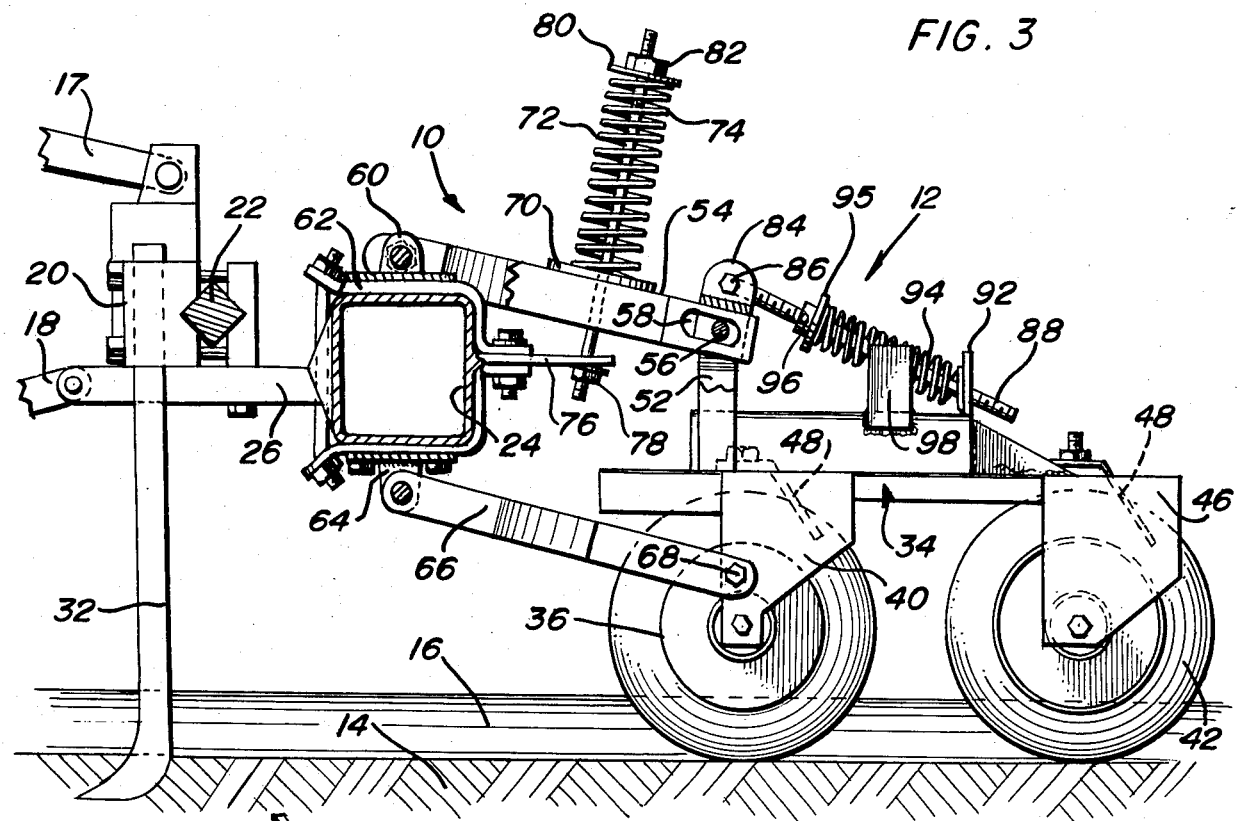
FIG. 3 is an enlarged sectional view on line 3—3 of FIG. 1, with parts broken away.
Figure 4:
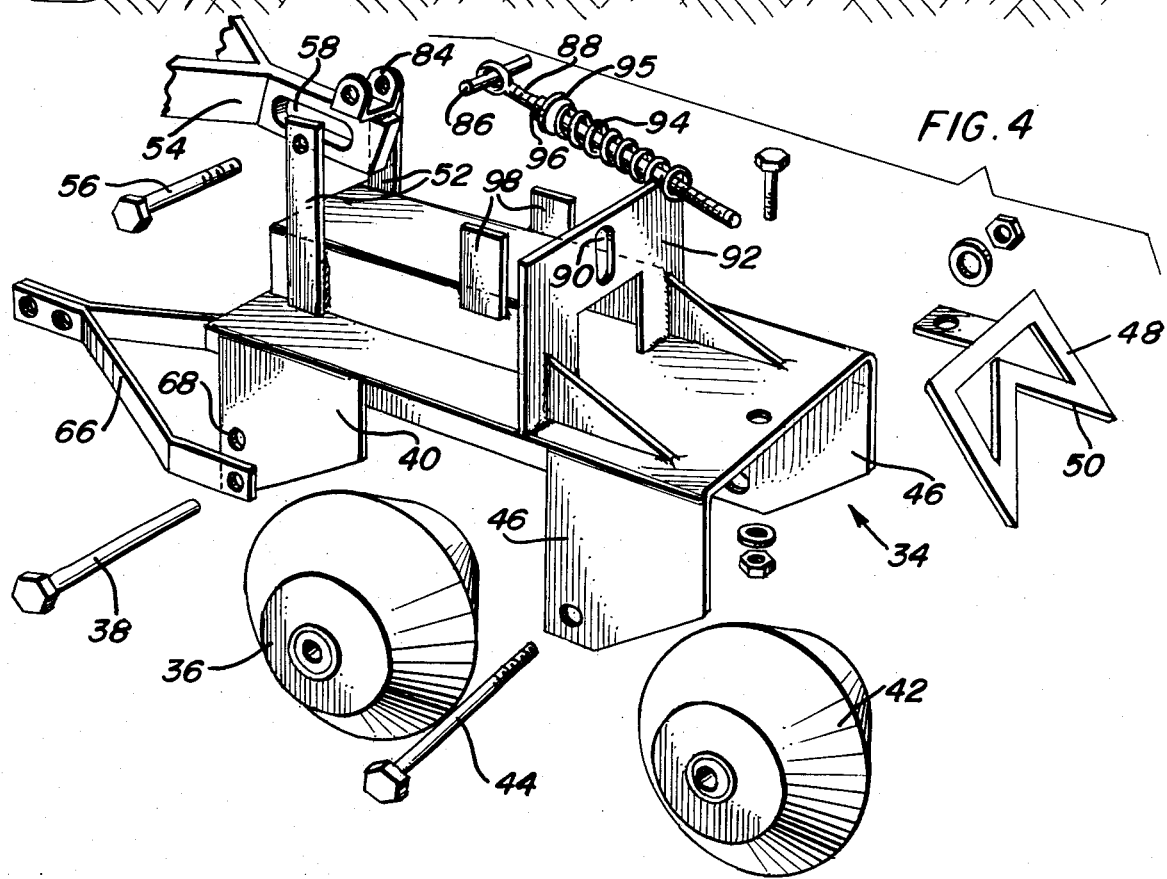
FIG. 4 is an exploded perspective view of parts of the apparatus shown in FIG. 3.

The furrow-forming attachments 12 are substantially identical, and accordingly only one of the attachments will be described in detail, with particular reference to FIGS. 3 and 4. Thus, each attachment 12 comprises a carriage 34 of fabricated metal plate having a forward furrow-forming roller 36, of V-shaped profile, journaled on a pin 38 between forward side plates 40, and an aft furrow-forming roller 42 journaled on a pin 44 between rear side plates 46. Bolt-on scrapers 48 each having a profile 50 complimentary to the rollers are provided on the carriage for cleaning the respective rollers. At its forward end, the carriage has upstanding supports 52 between which the rearward end of an upper pivotal suspension arm or link 54 is pivotally received, with a pivot pin 56 extending through suitable openings in the supports and through a slot 58 in arm 54. Forwardly of slot 58, arm 54 is bifurcated and its forward ends are pivotally secured to brackets 60 extending upwardly from a clamp 62 attached around the hollow tool bar 24. A lower portion of clamp 62 is provided with a bracket 64 for pivotally connecting the forward end of a lower pivotal suspension arm or link 66, the rear end of which is bifurcated and pivotally connected to the forward side plates 40 of the carriage by pivot connections 68.

On its upper surface, link 54 carries a mounting plate 70 for a primary coil suspension spring 72. A bolt 74 extends through spring 72, through the bifurcated portion of link 54, and through an anchor plate 76 secured to the hollow tool bar 24 by clamp 22, the lower end of bolt 74 being secured by a nut 78. At its upper end, bolt 74 extends through a top plate 80 and the upper end of the bolt is provided with an adjustment nut 82. The effect of spring 72 is thus to provide resilient downward pressure on link 54 (reacting against plate 76 secured to the tool bar) and thus on the carriage 34 particularly the forward roller 36. The degree of downward pressure can be adjusted by nut 82.

The back end of link 54 has a bracket 84 with a pivot pin 86 which mounts an eye bolt 88, the trailing end of which extends through an opening 90 in a plate 92 on the upper surface of carriage 34 between the rollers. A secondary tension spring 94 is positioned around the eye bolt and acts between plate 92 and a reaction plate 95 on the eye bolt which is held in position by an adjusting nut 96 whereby the tension of spring 94 can also be adjusted. The effect of spring 94 is to provide resilient downward pressure on aft roller 42 independently of the pressure exerted on roller 36 by spring 72. In this regard, a degree of pivotal movement of the carriage about pivot connection 68 is accomodated by movement of pin 56 in slot 58. Spring 94 is accomodated between guides 98.

In operation, the bull shanks 32 loosen soil forwardly of the respective furrow-forming attachments which are then effective to form relatively smooth regular furrows through the provision of like forward and aft furrow-forming rollers, the pressures of which can be adjusted individually to suit different soil conditions. The attachments are thus useful adjuncts for providing effective field irrigation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A furrow-forming attachment for a tractor and the like comprising a carriage having longitudinally aligned forward and aft ground-engageable furrow-forming rollers, a pivot linkage for connecting the carriage to a tool bar or the like in back of a tractor, a primary suspension spring assembly for connection between the linkage and tool bar or the like for applying resilient downward pressure on the carriage urging the forward roller toward ground engagement, and a secondary suspension spring assembly for connection between the linkage and a part of the carriage behind the forward roller for resiliently urging the aft roller into ground engagement independently of the forward roller, wherein the pivot linkage comprises an upper pivot link for connection between the carriage and tool bar or the like and a lower pivot link for connection between the carriage and the tool bar or the like, one of the said links having a slotted connection to the carriage for accommodating pivotal movement of the carriage about a connection with the other of said links.

2. The invention of claim 1 wherein the upper pivot link includes a bifurcated portion and the primary spring assembly comprises a primary coil spring atop the bifurcated portion, a rod with an upper reaction plate engaging the upper end of the coil spring, the rod extending through the coil spring and through the bifurcated portion of the upper link for connection at its lower end to the tool bar or the like.

3. The invention of claim 2 wherein the rod has a threaded upper end receiving an adjustment nut engaging the reaction plate for adjusting the tension of the coil spring by threading the nut along the rod.

4. The invention of claim 2 wherein the secondary spring assembly comprises a further rod pivotally connected at one end thereof to a bracket means at a rearward end of the upper pivot link, the rod extending downwardly at its other end through a plate on the carriage, a further reaction plate on the rod, and a secondary coil spring surrounding the rod and reacting between said plate on the carriage in said further reaction plate.

5. The invention of claim 4 including a further nut threaded on the further rod for engaging the further reaction plate and adjusting the tension of the secondary coil spring.

6. The invention of claim 1 wherein the rollers are of substantially identical form and have a substantially V-shaped profile.

7. The invention of claim 6 including scrapers on the carriage of inverted V-shaped form for cleaning the respective rollers.

8. Apparatus for forming an irrigation furrow in top soil of a crop growing field or the like comprising a towing vehicle, at least one furrow-forming attachment, and hitch means connecting the attachment to a tool bar at the rear of the vehicle for towing thereby over the field or the like wherein the attachment comprises a carriage having a forward roller for forming the furrow and an aft roller aligned longitudinally behind the forward roller for breaking up soil clods that may collect behind the forward roller and smoothing out the furrow walls, wherein the attachment includes suspension means for providing independently adjustable downward pressure on the forward and aft rollers respectively, wherein the suspension means includes a first tension adjustable suspension spring assembly connected between the hitch means and the tool bar forwardly of the carriage for applying resilient downward pressure on the forward roller, and a second tension adjustable suspension spring assembly connected between the hitch means and the carriage for applying independent resilient downward pressure on the aft roller, the second spring assembly extending rearwardly from the hitch means to a fitting on the carriage rearwardly of the forward roller.

9. Apparatus for forming an irrigation furrow in top soil of a crop growing field or the like comprising a towing vehicle, at least one furrow-forming attachment, and hitch means connecting the attachment to the rear of the vehicle for towing thereby over the field or the like wherein the attachment comprises a carriage having a forward roller for forming the furrow and an aft roller aligned longitudinally behind the forward roller for breaking up soil clods that may collect behind the forward roller and smoothing out the furrow walls wherein the attachment includes suspension means for providing independently adjustable resilient downward pressure on the forward and aft rollers respectively, wherein the hitch means includes upper and lower pivotal suspension links for connecting the carriage to a tool bar carried behind the towing vehicle, one of said links having a slotted connection with the carriage allowing pivotal movement of the carriage about a connection with the other of said links.

10. The invention of claim 9 wherein the suspension means includes a first tension-adjustable suspension spring assembly connected between the upper link and tool bar for applying resilient downward pressure on the forward roller, and a second-tension adjustable suspension spring assembly connected between the upper link and a fitting on the carriage rearwardly of the forward roller for applying independent resilient downward pressure on the aft roller.

11. The invention of claim 9 including a bull shank on the tool bar for loosening soil in advance of the forward roller.

12. The invention of claim 9 wherein the rollers are of substantially identical form and substantially V-shaped cross section.

13. The invention of claim 12 including scrapers on the carriage of inverted V-shaped form for cleaning the respective rollers.

14. The invention of claim 9 wherein the attachment is replicated along the tool bar to provide a row of like attachments for forming a corresponding row of like furrows in the top soil.

* * * * *